Sept. 16, 1941.    J. M. DALIMATA    2,256,140
WEEDER ATTACHMENT
Filed June 26, 1939    2 Sheets-Sheet 1
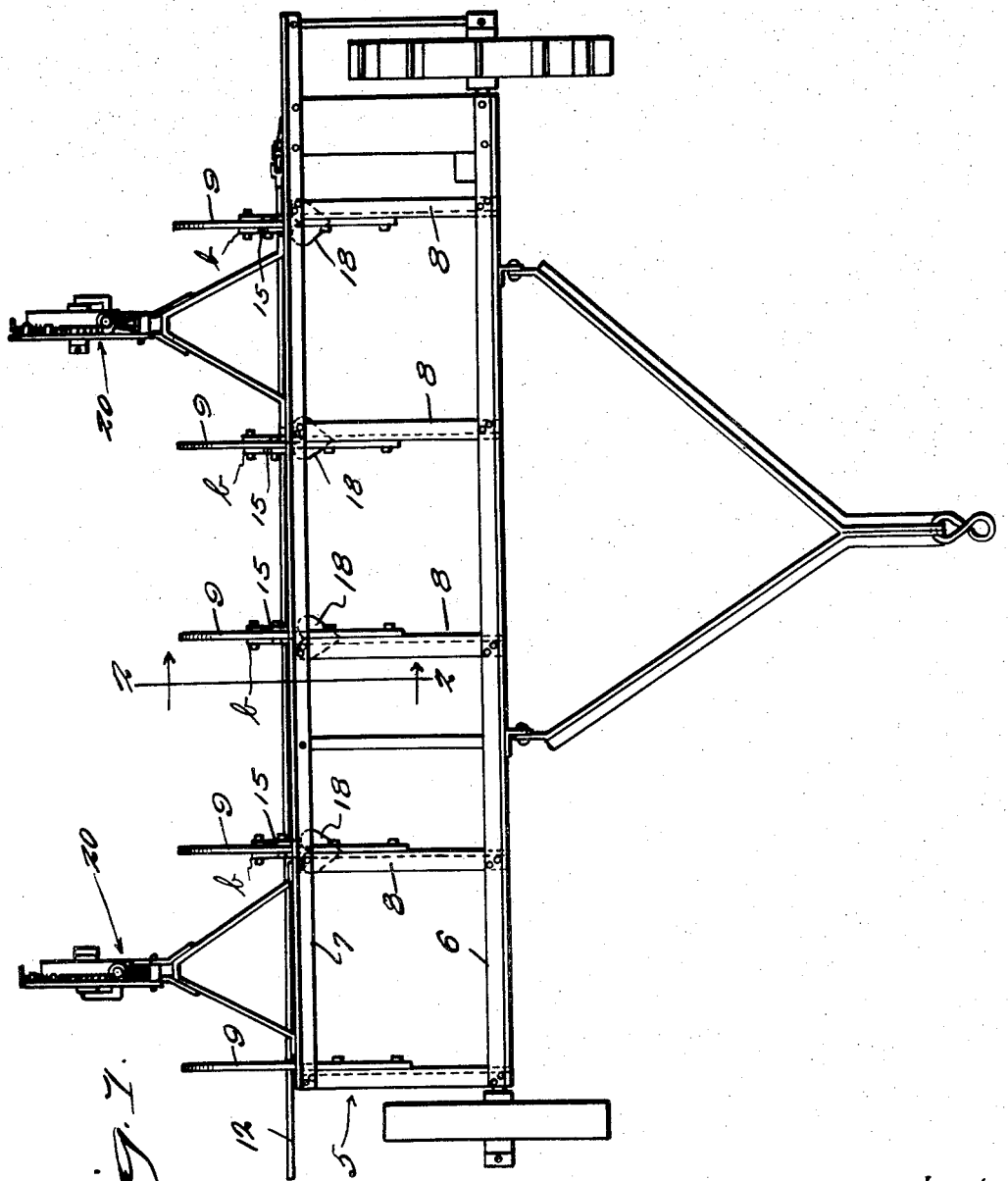
Inventor
John M. Dalimata
By Clarence A. O'Brien
and Hyman Berman
Attorneys Sept. 16, 1941.  J. M. DALIMATA  2,256,140
WEEDER ATTACHMENT
Filed June 26, 1939  2 Sheets-Sheet 2
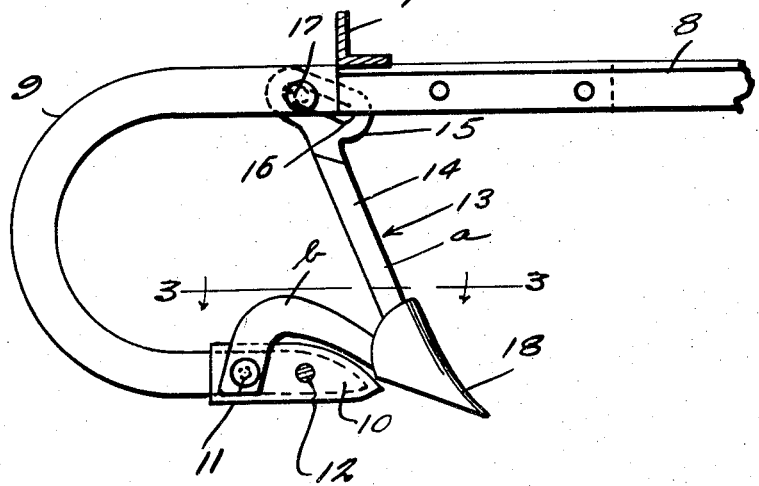
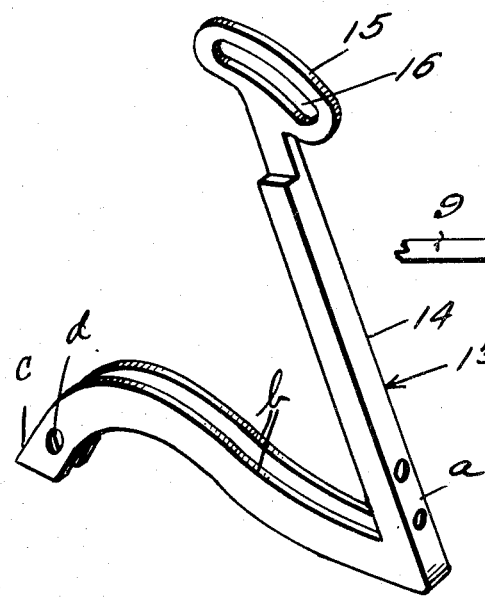
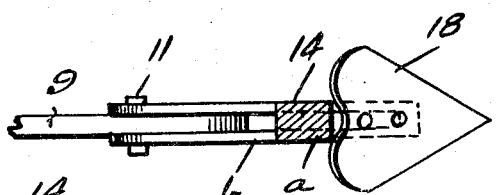
Inventor
John M. Dalimata
By Clarence A. O'Brien
and Hyman Berman
Attorneys Patented Sept. 16, 1941

2,256,140

UNITED STATES PATENT OFFICE 2,256,140

WEEDER ATTACHMENT

John M. Dalimata, Chester, Mont.

Application June 26, 1939, Serial No. 281,240

3 Claims. (Cl. 97—42)

This invention appertains to new and useful improvements in agricultural machines and more particularly to a rod weeder attachment.

The principal object of the present invention is to provide means for use in conjunction with rod weeders whereby the ground is furrowed in such a manner as to prevent soil erosion and soil displacement by high winds.

Another important object of the invention is to provide an attachment for weeders which will furrow the soil in such a manner as to conserve moisture.

These and various other important objects and advantages of the invention will become apparent to the reader of the following specification.

In the drawings:

Figure 1 represents a top plan view of the weeder with the attachment in place.

Figure 2 is a section on the line 2—2 of Figure 1.

Figure 3 is a section on the line 3—3 of Figure 2.

Figure 4 is a perspective view of the attachment frame.

Referring to the drawings wherein like numerals designate like parts, it can be seen in Figures 1 and 2, that numeral 5 generally refers to the rod weeder machine which consists of the front and rear frame bars 6 and 7, respectively, bridged by the bars 8 extending from front to rear.

Extending backwardly, downwardly and forwardly from these bars 8 are the beams 9 which terminate in tapered end portions over which the rod weeder shoes 10 are disposed and secured in place by bolts 11.

The weeder rod 12 extends through the shoes and for the entire width of the machine, as shown in Figure 1.

The attachment is generally referred to by numeral 13 and consists of the substantially V-shaped frame 14 consisting of the upper and lower legs a and b of channel construction, the rear portion of the leg b being curved downwardly as at c and having the openings d disposed thereat through for receiving the bolt 11 which is also utilized for the corresponding shoe 10. A lower portion of the leg b is bifurcated to straddle the shoe 10 as suggested in Figure 2.

Numeral 15 represents an obliquely disposed head having the slotway 16 therein and through this slotway and through the upper portion 9 is disposed the bolt 17 which can be tightened in place to permit proper adjustment of the frame 14 and the lister shovel 18 carried by the heel portion of the frame 14. This lister 18 extends forwardly of the shoe 10 but does not interfere with the function of the shoe or the weeding action of the bar 12, the shovels 18 serving to furrow the ground so as to leave the same ridged for the purpose of preventing ground erosion and for the further purpose of conserving moisture.

The adjustment 15, 16 and 17 is employed as compensatory to the adjusting means generally referred to by numeral 20 which is intended for controlling the weeder bar 12 with respect to the ground.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a rotary rod weeder, the combination with a rotary rod and the supporting members therefor, of a furrow forming plow located in front of a portion of the rod, and means for supporting the plow from a supporting member of the rod with the upper portion of the plow projecting from the ground to provide a furrow in the ground after the passage of the weeder.

2. A furrow forming attachment for a rotary rod weeder which includes curved beams, shoes at the lower ends of the beams and a rod rotatably supported by the shoes, said attachment comprising a downwardly and forwardly sloping bar having an enlarged upper end formed with a solt which slopes downwardly and forwardly, a bolt passing through the slot and through a top part of a beam, the lower end of the bar extending to a point in front of a shoe, a second bar integrally connected at its front end to the lower end of the first bar, said second bar curving upwardly and rearwardly over a shoe and then downwardly into engagement with a side part of said shoe, a plow fitting over the lower end of the first bar and means for attaching the plow to said lower end of the first bar with the upper portion of the plow projecting from the ground to provide a furrow in the ground after the passage of the weeder.

3. A furrow forming attachment for a rotary rod weeder which includes curved beams, shoes at the lower ends of the beams and a rod rotatably supported by the shoes, said attachment comprising a downwardly and forwardly sloping bar, means for adjustably connecting the upper end of the bar to a beam, a second bar integrally connected at its front end to the lower end of the first bar and said second bar being of forked construction and curving upwardly and rearwardly over a shoe and then downwardly with the ends of the prongs fitting over the rear portion of the shoe, a bolt for connecting said ends of the prongs to the shoe, a plow fitting over the lower end of the first bar, and means for attaching the plow to said lower end of the first bar with the upper portion of the plow projecting from the ground through which the rod and shoe passes to provide a furrow in the ground after the passage of the weeder.

JOHN M. DALIMATA.